US005430307A

United States Patent [19]

Nagashima

[11] Patent Number: 5,430,307

[45] Date of Patent: Jul. 4, 1995

[54] LIGHT SCATTERING SMOKE DETECTOR WITH SMOKE-ENTRANCE LADYRINTH DESIGNED TO PREVENT FALSE SIGNALS DUE TO REFLECTION

[75] Inventor: Tetsuya Nagashima, Tokyo, Japan

[73] Assignee: Hochiki Corporation, Tokyo, Japan

[21] Appl. No.: 225,299

[22] Filed: Apr. 8, 1994

[30] Foreign Application Priority Data

Apr. 9, 1993 [JP] Japan .................................. 5-082824
Nov. 30, 1993 [JP] Japan .................................. 5-299268

[51] Int. Cl.$^6$ .............................................. G01N 15/06
[52] U.S. Cl. ...................................... 250/574; 340/630
[58] Field of Search ......................... 250/574; 340/630; 356/438, 439

[56] References Cited

U.S. PATENT DOCUMENTS

| | | | |
|---|---|---|---|
| 4,216,377 | 8/1980 | Hasegawa et al. | 250/574 |
| 4,397,557 | 8/1983 | Herwig et al. | 356/342 |
| 4,469,953 | 9/1984 | Fujisawa et al. | 250/574 |
| 4,758,733 | 7/1988 | Mochizuki | 250/574 |
| 4,851,819 | 7/1989 | Kawai et al. | 340/630 |
| 4,897,634 | 1/1990 | Sawa et al. | 340/630 |
| 5,021,677 | 6/1991 | Igarashi et al. | 250/574 |

FOREIGN PATENT DOCUMENTS

| | | |
|---|---|---|
| 1250297 | 10/1971 | United Kingdom . |
| 1560421 | 2/1980 | United Kingdom . |
| 2270157 | 3/1994 | United Kingdom . |

*Primary Examiner*—David C. Nelms
*Assistant Examiner*—Steven L. Nichols
*Attorney, Agent, or Firm*—Sughrue, Mion, Zinn, Macpeak & Seas

[57] ABSTRACT

A smoke detector in which a plurality of labyrinth members are disposed on an upper wall in a standing position. In an area surrounded by the labyrinth members, a smoke detecting chamber is formed. A light emitting device and a light detecting device are disposed in such a manner that their optical axes intersect each other at the center of the smoke detecting chamber. In order for the visual field of the light detecting device with respect to the smoke detecting chamber to be restricted to the front area thereof, the labyrinth member which cross the optical axis of the light emitting device is formed so as to be longer than the other labyrinth members, and a gap is formed between the front end of the long labyrinth member and a light shielding plate for preventing the light emitted by the light emitting device from directly reaching the light detecting device. Therefore, the zero-point level of the detection output for light scattered by smoke is lowered to enhance the reliability and effectiveness of the smoke detector.

10 Claims, 8 Drawing Sheets

LIGHT SCATTERING SMOKE DETECTOR WITH SMOKE-ENTRANCE LADYRINTH DESIGNED TO PREVENT FALSE SIGNALS DUE TO REFLECTION

BACKGROUND OF THE INVENTION

1. Field of the Invention

The present invention relates to a light scattering type smoke detector which senses smoke by detecting light scattered by smoke. More particularly, the invention pertains to a labyrinth structure of a light scattering type smoke detector.

2. Description of the Related Art

FIGS. 1 and 2 show a plan view and a perspective view, respectively, of a conventional smoke detector. A smoke detecting section body 2 is formed in a substantially cylindrical shape. An upper wall 8 is attached to the ceiling of the room in which the smoke detector is used. On the upper wall 8, a plurality of labyrinth members 9 are provided in a standing position. A smoke detecting chamber is formed in an area surrounded by the labyrinth members 9. In order to facilitate the inflow of smoke from the outside, and to cut off light entering from the outside, each of the labyrinth members 9 is formed so as to have a substantially chevron-like or L-like horizontal section shape. Smoke inlets formed between the respective labyrinth members 9 are covered by an insect screen 5 surrounding the labyrinth members so that insects are prevented from invading the smoke detecting chamber and scattering light.

On the upper wall 8, moreover, recess portions 10 and 11, and light shielding plates 14 are disposed in a standing position. In the recess portions 10 and 11, a light emitting device 12 and a light detecting device 13 are respectively disposed so that the optical axes of the light emitting device 12 and the light detecting device 13 intersect each other at the center of the smoke detecting chamber constituted by the labyrinth members 9. The light shielding plates 14 prevent light emitted by the light emitting device 12 from directly reaching the light detecting device 13. In each of the recess portions 10 and 11, an opening is formed so that the light detecting device 13 does not directly receive the light emitted by the light emitting device 12. In the figures, the area of the visual field of the light detecting device 13 is indicated as a hatched portion b.

The detection output of the light detecting device 13 is at a zero-point level when there is no smoke. When smoke flows into the smoke detecting chamber, light scattered by the smoke is detected by the light detecting device 13. Additionally, reference numerals 16 and 17 designate holder covers for the recess portions 10, 11, respectively.

However, in the above-described conventional smoke detector, the labyrinth members 9 are merely constructed in such a manner that smoke from the outside easily enters thereinto, that light entering from the outside is cut off, and that the light detecting device 13 does not directly receive the light emitted by the light emitting device 12. Accordingly, the light emitted by the light emitting device 12 is reflected several times by flat portions, front end faces and edges of the labyrinth members 9, so as to diffuse light in the smoke detecting chamber. In addition, since the visual field of the light detecting device 13 is relatively wide, the diffused light can reach the light detecting surface of the light detecting device 13. As a result, the zero-point level of the detection output of the light detecting device 13 has to be raised. Therefore, there exists a problem in that the S/N ratio is lowered and hence the reliability and effectiveness of the smoke detector is degraded.

SUMMARY OF THE INVENTION

In view of the above problems, it is an object of the present invention to provide a light scattering type smoke detector in which the zero-point level of the detection output for light scattered by smoke can be lowered, thereby enhancing the reliability and effectiveness of the smoke detector.

In order to solve the above-mentioned problems, the present invention provides a light scattering type smoke detector comprising a plurality of labyrinth members for facilitating inflow of smoke from the outside and cutting off light entering from the outside, smoke inlets formed by spaces between respective labyrinth members, a smoke detecting chamber constituted by the labyrinth members in a center portion of the smoke detector, a light emitting device for emitting light toward the smoke detecting chamber, a light detecting device whose optical axis crosses the optical axis of the light emitting device in the smoke detecting chamber and which receives light scattered by the smoke, and a light shielding plate for shielding light emitted by the light emitting device from being received directly by the light detecting device, wherein the length of a labyrinth member crossing the optical axis of the light emitting device of the plurality of labyrinth members is longer than the length of an adjacent labyrinth member of the plurality of labyrinth members, and wherein the long labyrinth member is disposed across the optical axis of the light emitting device from the light shielding device.

Further, another embodiment of a light scattering type smoke detector of the present invention comprises a plurality of labyrinth members for facilitating inflow of smoke entering from the outside and cutting off light entering from the outside, smoke inlets formed by spaces between respective labyrinth members, a smoke detecting chamber constituted by the labyrinth members in a center portion of the detector, light emitting device for emitting the light toward the smoke detecting chamber, a light detecting device whose optical axis crosses the optical axis of the light emitting device in the smoke detecting chamber and which receives light scattered by the smoke, and a light shielding plate for shielding the light emitted by the light emitting device from being received directly by the light detecting device, wherein at least one of the plurality of labyrinth member has a top end bent portion which is parallel to one of the plurality of labyrinth members opposite and adjacent to the top end bent portion.

DESCRIPTION OF THE PREFERRED EMBODIMENTS

Figure 3A:
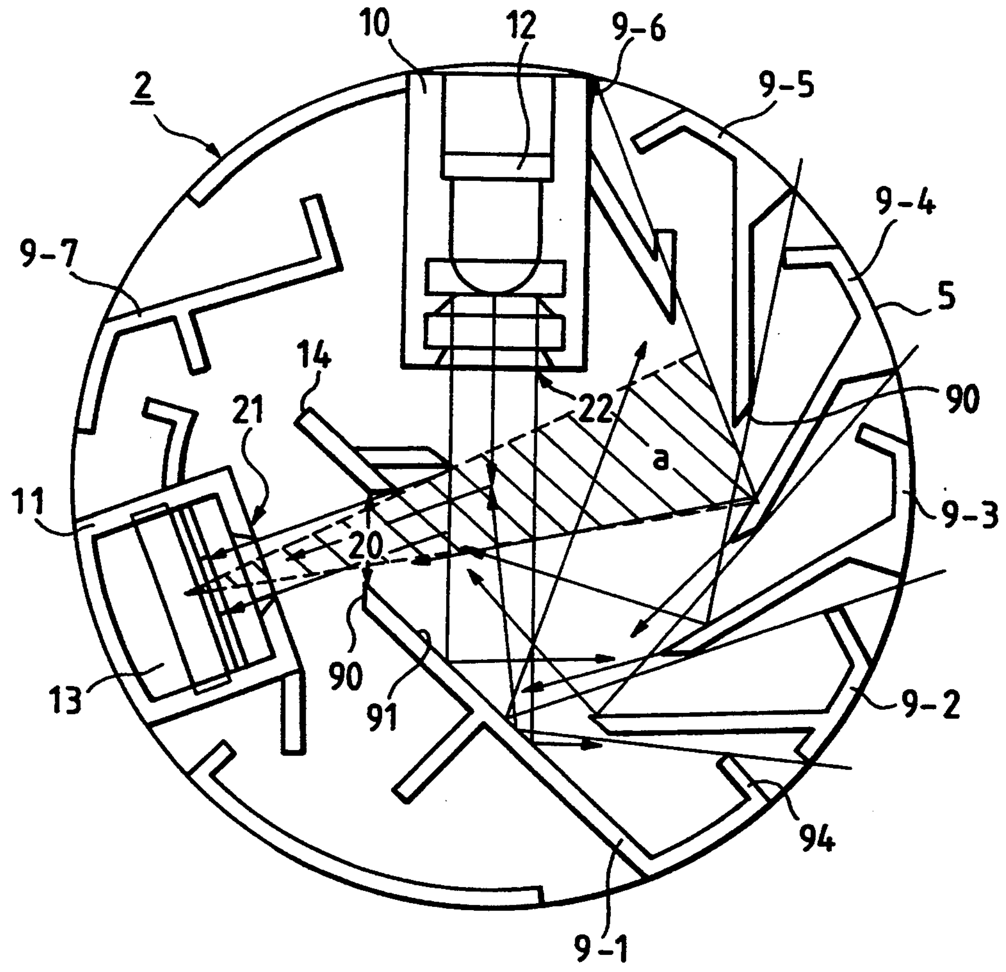
FIG. 3(*a*), 3(*b*) and 3(*c*) are plan views showing an embodiment of a light scattering type smoke detector according to the invention.
Figure 3B:
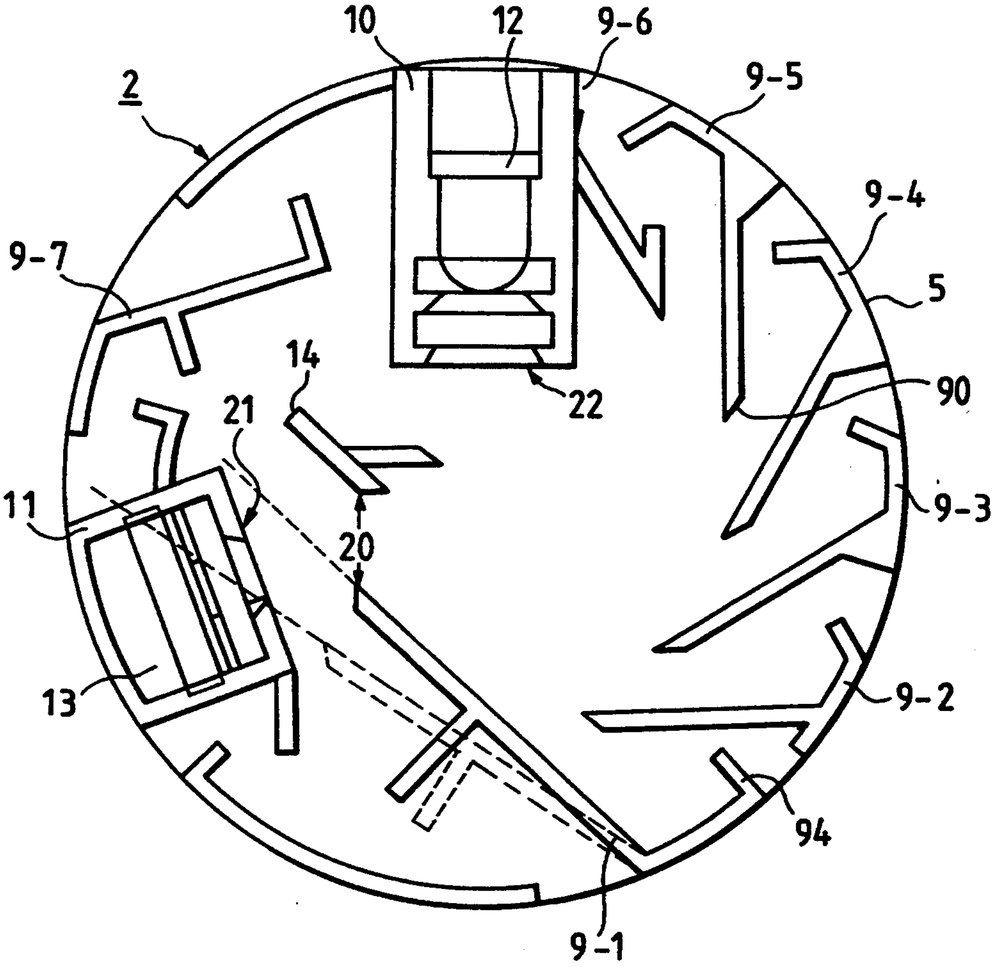
Figure 3C:
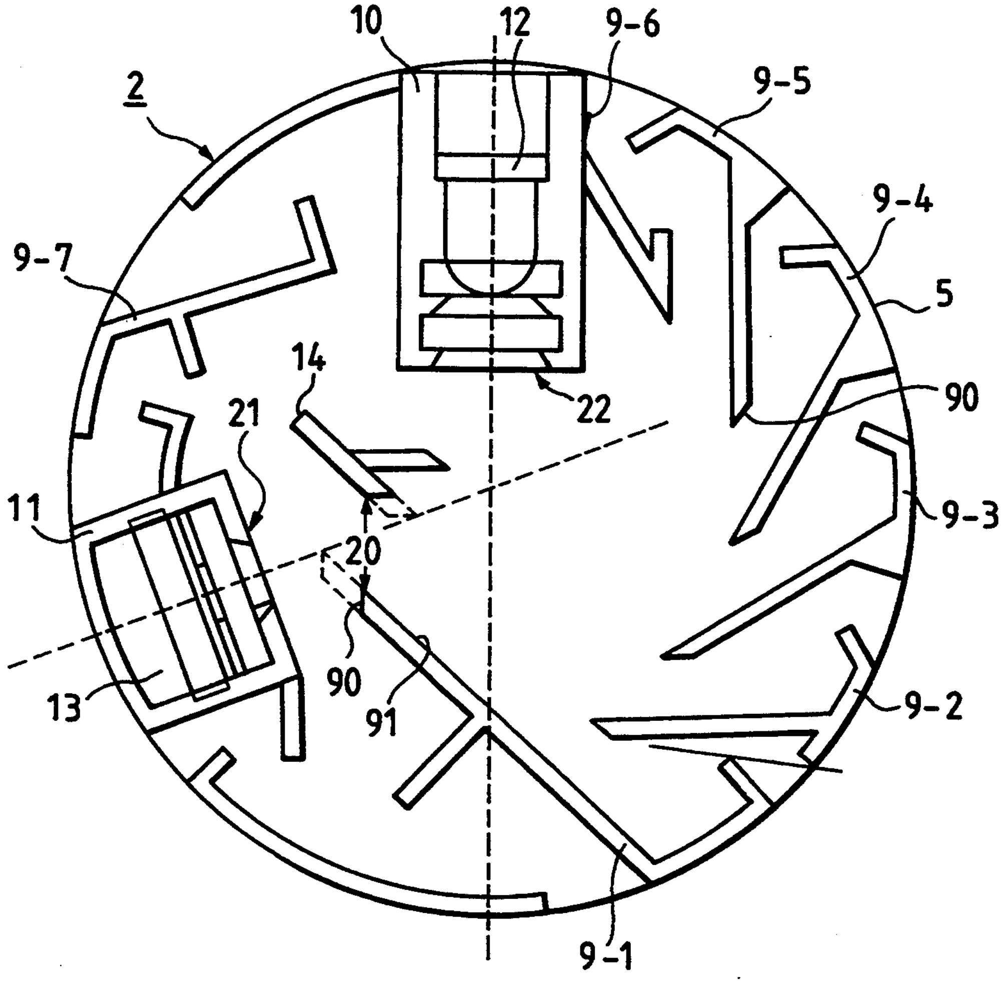

Preferred embodiments of the present invention will be described with reference to the accompanying drawings. FIG. 3(*a*) is a plan view showing an embodiment of the light scattering type smoke detector according to the invention.

Figure 1:
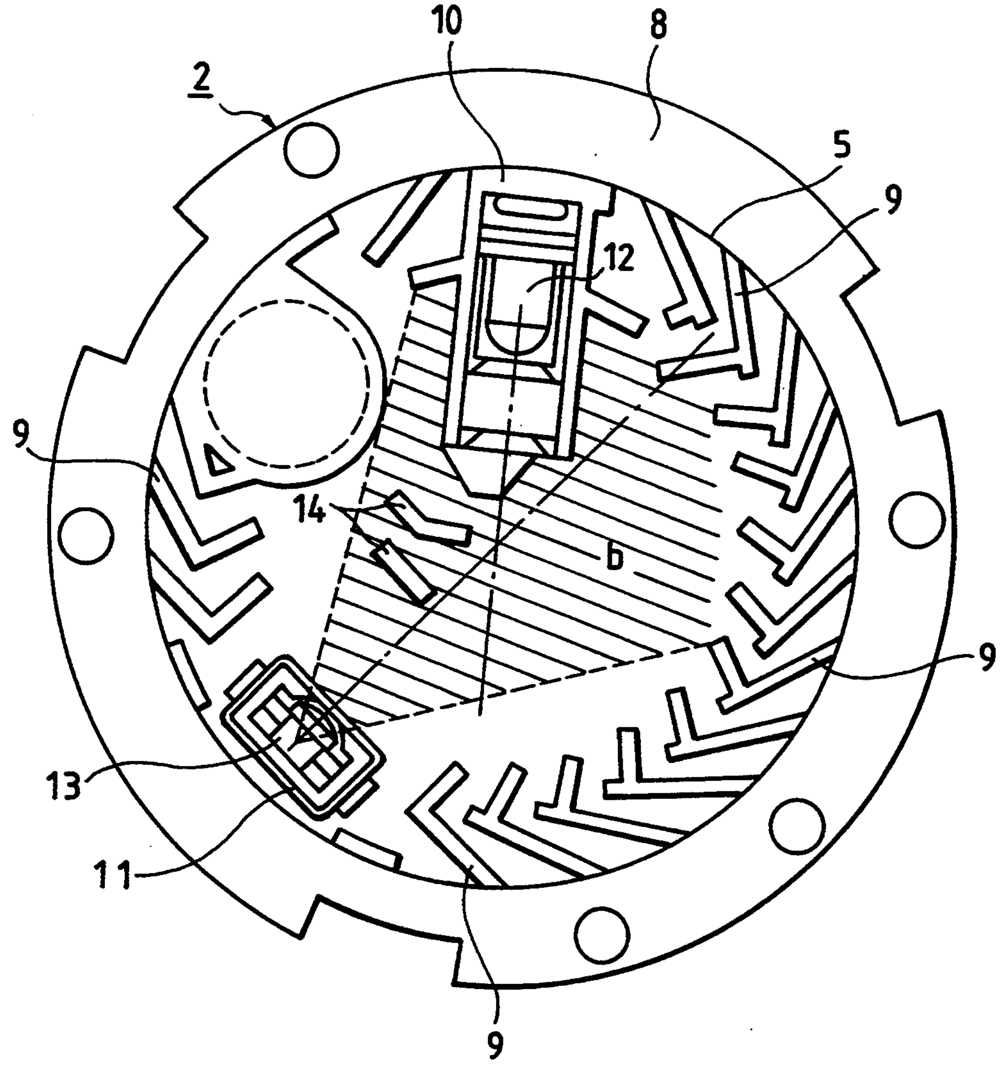
FIG. 1 PRIOR ART
FIG. 1 is a plan view showing a conventional light scattering type smoke detector.

In FIG. 3(*a*), a smoke detecting section body 2 is formed in a substantially cylindrical shape, as in the conventional smoke detector. An upper wall 8 as shown in FIG. 1 (not shown here) is attached to the ceiling. On the upper wall 8, a plurality of labyrinth members 9-1 to 9-7 are provided in a standing position. In an area surrounded by the labyrinth members 9-1 to 9-7, a smoke detecting chamber is formed. The labyrinth members 9-1 to 9-6 are formed in such a manner as to facilitate the inflow of smoke from the outside and cut off light entering from the outside.

Figure 2:
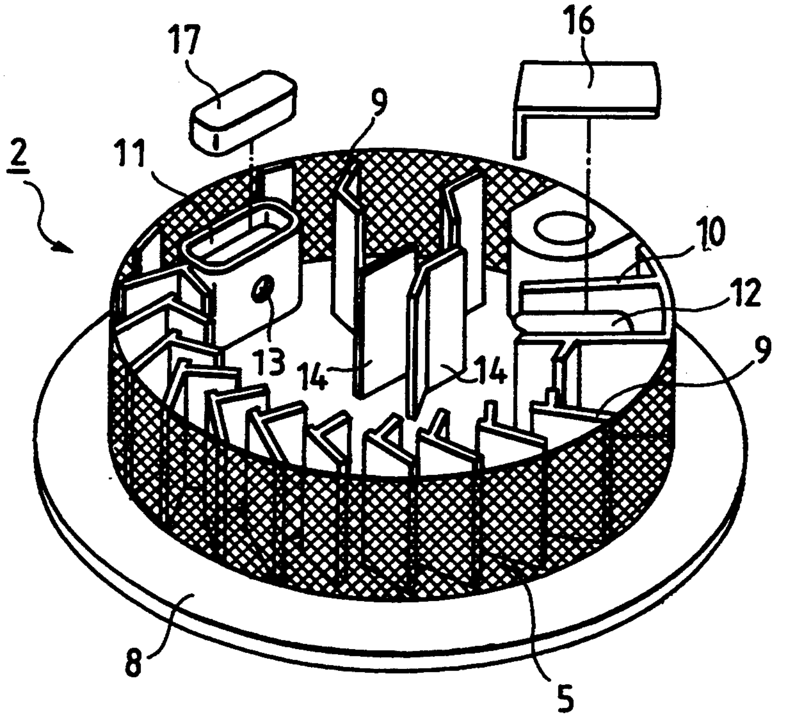
FIG. 2 PRIOR ART
FIG. 2 is a perspective view showing a conventional light scattering type smoke detector.

As depicted in FIG. 2, smoke inlets formed by spaces between respective labyrinth members 9-1 to 9-6 are covered by an insect screen 5 surrounding the labyrinth members so that insects are prevented from entering the smoke detecting chamber and scattering light, causing a false alarm.

On the upper wall 8, holder portions 10 and 11 and a light shielding plate 14 are disposed in a standing position. The holder portions 10 and 11 are formed as recess portions in which a light emitting device 12 and a light detecting device 13 are respectively disposed with the optical axes of the light emitting device 12 and the light detecting device 13 intersecting each other at the center of the smoke detecting chamber constituted by the labyrinth members 9-1 to 9-6. The light shielding plate 14 prevents light emitted by the light emitting device 12 from directly reaching the light detecting device 13. The holder portions 10 and 11 are respectively provided with openings 22 and 21 for restricting their visual fields so that the light detecting device 13 does not directly receive the light emitted by the light emitting device 12. Hatched portion a corresponds to the area of the visual field of the light detecting device 13.

In this embodiment, the labyrinth members 9-1 to 9-6 are structured in the following manner. In order to restrict the visual field of the light detecting device 13 with respect to the smoke detecting chamber to only the front area of the light detecting device 13, the labyrinth member 9-1 which crosses the axis of the light emitting device 12 is relatively longer than the other labyrinth members 9-2 to 9-6, and a gap 20 is formed between the front end of the labyrinth member 9-1 and the light shielding plate 14. The width of the gap 20 in a direction perpendicular to the direction of the optical axis is, for example, about 3 to 5 mm.

As shown in FIG. 3(*c*), the labyrinth member 9-1 is disposed across the optical axis of the light detecting device 13 from the light shielding plate 14. Further, in order to maintain the gap 20 and to receive the scattered light exactly as desired, the lengths of the labyrinth member 9-1 and the shield plate 14 do not preferably reach the optical axis of the light detecting device 13.

In addition, the labyrinth members 9-1 to 9-6, particularly the labyrinth member 9-1 which opposes the light emitting face of the light emitting device 12, are structured in such a manner that the end faces 90 of the labyrinth members are not directed toward the light emitting face of the light emitting device 12, and flat portions 91 are formed at such an angle that they reflect light emitted by the light emitting device 12 not in the direction toward the light detecting surface of the light detecting device 13, but in the direction toward the outside of the smoke detector for escape.

Furthermore, as shown in FIG. 3(*b*), if the extension line of the labyrinth member 9-1 crosses the receiving face of the receiving device or lies outside of the receiving device, a light reflected by a labyrinth member may be received by the receiving device 13. Accordingly, the extension line of the labyrinth member 9-1 is preferably in the inside of the receiving face of the receiving device toward the center of the smoke detecting chamber.

As shown in FIGS. 3(*a*) to 3(*c*), each of the labyrinth members 9-1 to 9-6 has rear bent portion 94 at the end thereof so as to cut off light entering from outside the smoke detector.

With this arrangement, even if light emitted by the light emitting device 12 is reflected several times by the surfaces and front end edges of the labyrinth members 9-1 to 9-6 so as to diffuse in the smoke detecting chamber, the light detecting device 13 is shielded from the diffused light by the labyrinth member 9-1 and the light shielding plate 14. In addition, the visual field of the light detecting device 13 is restricted by the gap 20 and the opening 21, so that the area of the visual field is smaller than that in the conventional smoke detector. Accordingly, it is possible to lower the zero-point level of the detection output of the light detecting device 13.

As described above, the labyrinth members 9-1 to 9-6 are arranged so that the end faces 90 thereof are not directed to the light emitting face of the light emitting device 12, and are at such angles that the flat portions 91 of the labyrinth members do not reflect the light emitted by the light emitting device 12 in the direction toward the light detecting surface of the light detecting device 13, but reflect the light toward the outside. Due to this arrangement, it is possible to reduce the amount of light which is reflected by the labyrinth members 9-1 to 9-6 toward the light receiving surface of the light detecting device. Accordingly, the zero-point level of the detection output for light scattered by smoke can be lowered.

As a result, the signal-to-noise ratio of the smoke detector can be improved, and hence the reliability and effectiveness of the smoke detector can be enhanced. In addition, it is possible to provide a sufficient margin for various problems such as dust or dew formation. Furthermore, since the area which receives the reflected light in the smoke detecting chamber can be limited, it is sufficient to put emphasis on the design of the labyrinth structure surrounding the light receiving area. Thus, it becomes possible to increase the degree of freedom of the design of the labyrinth structure against the inflow of smoke and optical disturbances.

Figure 4:
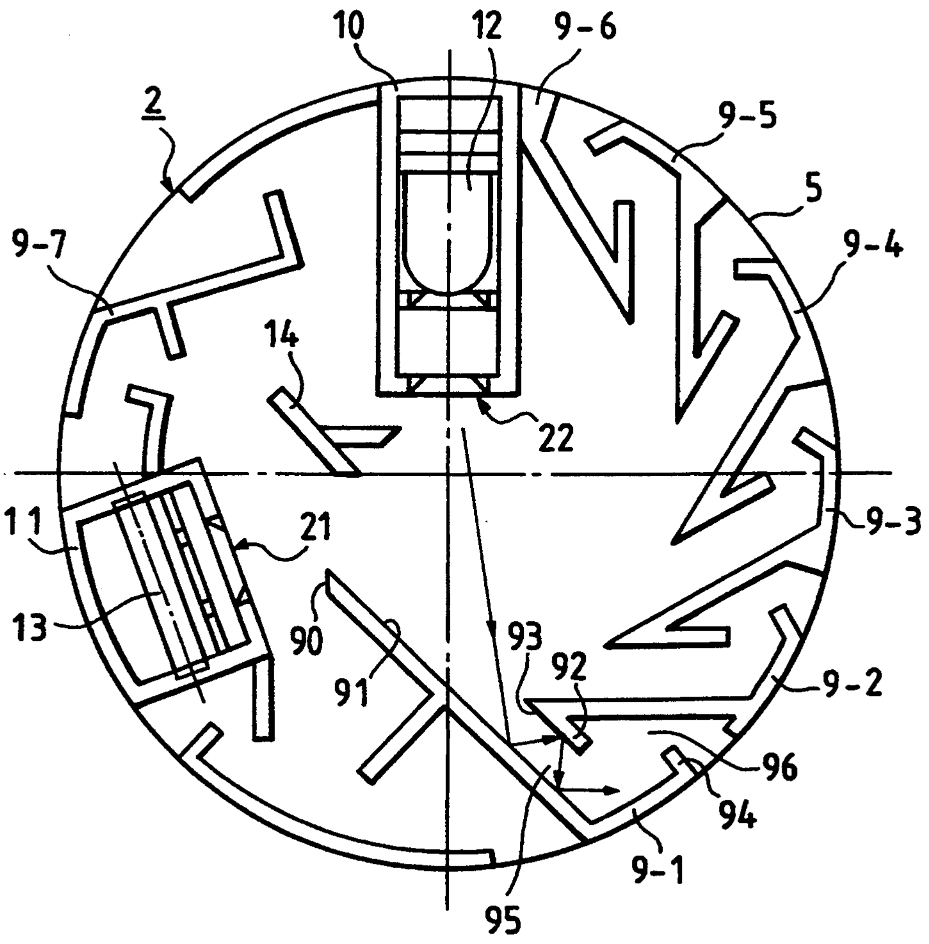
FIG. 4 is a plan view showing another embodiment of the light scattering type smoke detector according to the invention.

FIG. 4 shows another embodiment of the invention, which is a modification of the light scattering type smoke detector depicted in FIG. 3(*a*). In this embodiment, the labyrinth members 9-1 to 9-6 are constructed in the following manner.

With respect to the adjacent labyrinth members 9-1 and 9-2, for example, the passage structure formed between the labyrinth members 9-1 and 9-2 and extending from inside of the smoke detecting chamber to the outside is configured so that a parallel passage portion 95 and a labyrinth passage portion 96 are successively formed by each adjacent pair of labyrinth members 9-1 to 9-6.

The parallel passage portion 95, which opens in the inner smoke detecting chamber, is formed by disposing a front bent portion 92 at the front end of the labyrinth member 9-2. The front bent portion 92 has a flat portion 93 which is parallel to the flat portion 91 of the adjacent labyrinth member 9-1.

The outer labyrinth passage portion 96 which follows the parallel passage portion 95 is formed by disposing a rear bent portion 94 at the rear end of the labyrinth member 9-1. The smoke enters the labyrinth structure in which a plurality of bends are formed between the smoke inlet to the parallel passage portion 95.

According to the passage structure having the parallel passage portion 95 and the labyrinth passage portion 96, light emitted by the light emitting device 12 and entering the parallel passage portion 95 travels to outside of the smoke detecting chamber while being reflected by both the flat portion 91 and the flat portion 93 parallel to the flat portion 91 which constitute the parallel passage portion 95.

Such traveling of light is similar to light traveling through a parallel passage such as an optical fiber by reflection. The light which travels in the parallel passage portion 95 then enters the labyrinth passage portion 96. The light is attenuated and absorbed as a result of the repetitive reflection in the labyrinth structure which has a plurality of bends and which is formed by the rear bent portion 94, or is reflected to the outside of the smoke detecting chamber through the smoke inlet. Thus, the light can never return to the smoke detecting chamber. Therefore, it is possible to further lower the zero-point level of the detection output to detect light scattered by smoke.

Figure 5:
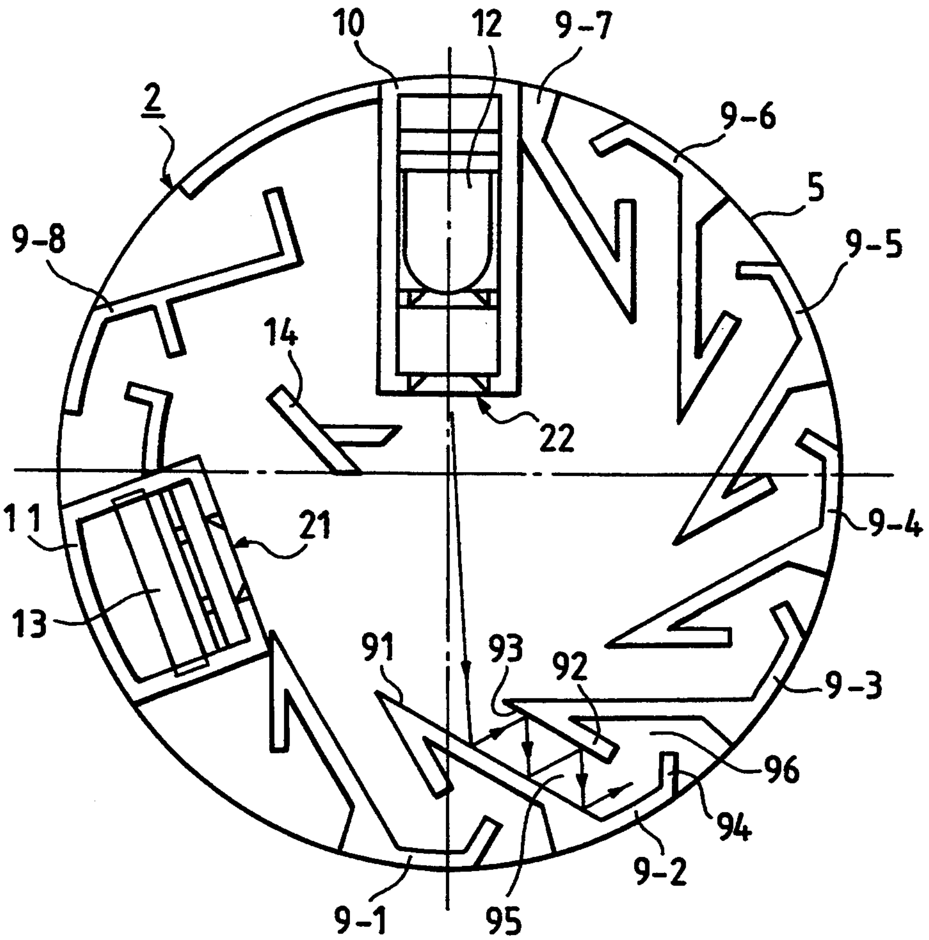
FIG. 5 is a plan view showing an embodiment of a light scattering type smoke detector according to the invention.

FIG. 5 shows a further embodiment of the invention. While the embodiment shown in FIG. 4 is a modification of the smoke detector construction shown in FIGS. 3(*a*)–3(*c*), the embodiment shown in FIG. 5 is directed to a smoke detector construction with a labyrinth structure in which a parallel passage portion and a labyrinth passage portion are formed by adjacent labyrinth members, as in FIG. 4.

In FIG. 5, labyrinth members 9-1 to 9-8 are disposed in the following manner. With respect to labyrinth members 9-1 to 9-7, unlike labyrinth member 9-1 shown in FIG. 3(*a*), the length of the labyrinth member 9-1 which crosses the optical axis of the light emitting device 12 is not longer than, and is substantially the same as, those of the other labyrinth members 9-2 to 9-7.

The passage structures are formed by the labyrinth members 9-1 to 9-7 in the following manner. As shown by the labyrinth members 9-2 and 9-3, for example, a parallel passage portion 95 and a labyrinth passage portion 96 are successively formed between each adjacent pair of labyrinth members 9-1 to 9-7. The parallel passage portion 95 is formed by disposing a front bent portion 92 having a flat portion 93 at the front end of the labyrinth member 9-3. The flat portion 93 is parallel to the flat portion 91 of the adjacent labyrinth member 9-2. The labyrinth passage portion 96 is formed by disposing a rear bent portion 94 at the rear end of the labyrinth member 9-1 through which the smoke enters.

Also in this embodiment, light emitted by the light emitting device 12 and entering the parallel passage portion 95 travels to outside the smoke detecting chamber while being reflected by both the flat portion 91 and the flat portion 93 parallel thereto which constitute the parallel passage portion 95. The light is attenuated and trapped by the rear bent portion 94 which follows the parallel passage portion 95. Thus, the light never returns to the smoke detecting chamber. Therefore, it is possible to lower the zero-point level of the detection output to detect light scattered by smoke.

In addition, since the rear bent portion 94 is disposed in the smoke inlet side of the labyrinth passage portion 96, external light is prevented from entering by the rear bent portion 94. The disposition of the rear bent portion 94 increases the number of bends of the labyrinth passage portion 96 (i.e., the number of traps). Accordingly, the interior light can be reflected a large number of times. Thus, even if the interior light returns to the inside of the smoke detecting chamber by reflection, the returning light is sufficiently attenuated.

Figure 6:
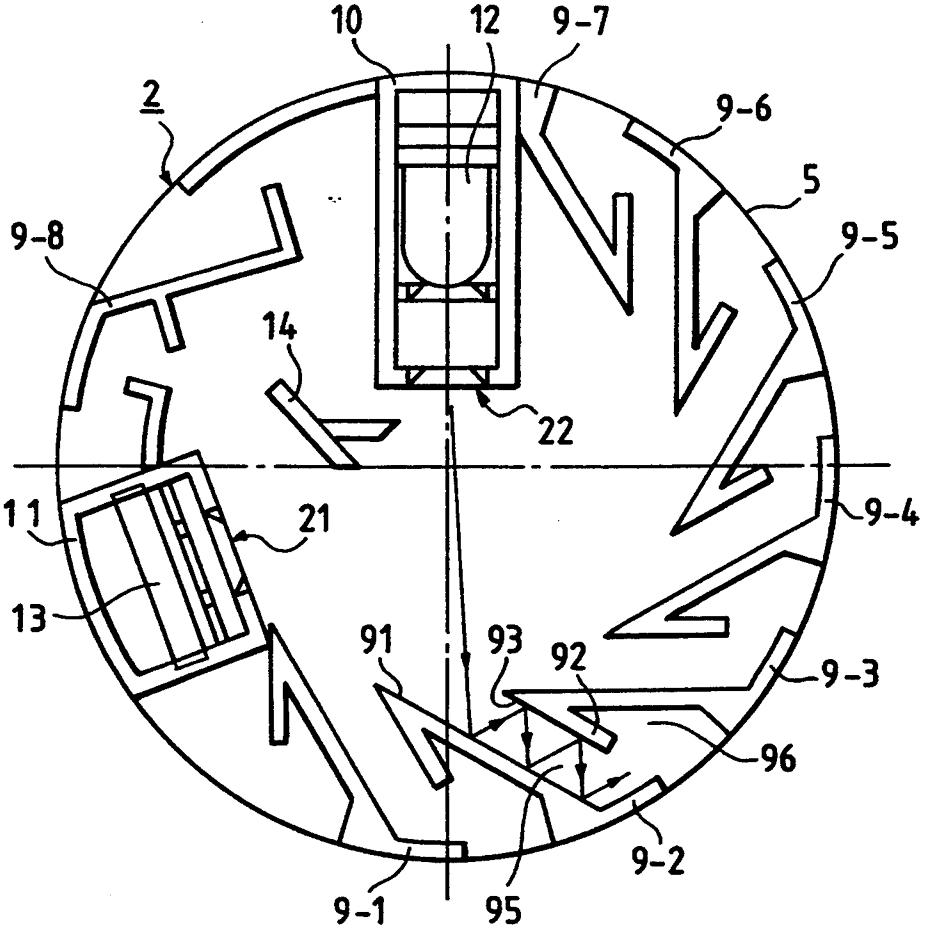
FIG. 6 is a plan view showing another embodiment of the light scattering type smoke detector according to the invention.

FIG. 6 shows another embodiment of the invention. In the embodiment, the rear bent portion 94 of FIG. 5, which is disposed in the outer side of the labyrinth passage portion 96, is not provided. Without the rear bent portion 94, the interior light which enters the labyrinth passage portion 96 can escape outside the smoke detecting chamber and the smoke inflow can be improved.

Also, the labyrinth passage portion 96 of FIG. 4 may be formed without the rear bent portion 94.

As described above, according to the invention, a light scattering type smoke detector is provided including a plurality of labyrinth members for facilitating the inflow of smoke entering from the outside and for cutting off light entering from the outside, the labyrinth members constituting a smoke detecting chamber in a center portion of the detector, and a light emitting device and a light detecting device whose optical axes intersect each other in the smoke detecting chamber constituted by the labyrinth members. One of the labyrinth members which opposes a light emitting surface of the light emitting device is longer than the other labyrinth members. A gap is formed between the front end of the one labyrinth member and a light shielding plate for preventing light emitted by the light emitting device from directly reaching the light detecting surface of the light detecting device, thereby restricting the visual field of the light detecting device with respect to the smoke detecting chamber to only the front area of the light detecting device. Therefore, it is possible to reduce the amount of light which is reflected a large number of times by the surfaces and the front edges of the other labyrinth members and diffused in the smoke detecting chamber, and which then reaches the light detecting surface of the light detecting device.

Furthermore, according to the invention, an end face of the labyrinth member which opposes the light emitting face of the light emitting device is formed so as not to be directed toward the light emitting face of the light emitting device. Therefore, it is possible to reduce the amount of light which reaches the light detecting surface of the light detecting device. A flat portion of the labyrinth member which opposes the light emitting face of the light emitting device is formed at an angle at which light emitted by the light emitting device is not reflected in the direction toward the light detecting surface of the light detecting device but is reflected in the direction toward the outside. Therefore, it is possible to reduce the amount of light which reaches the light detecting surface of the light detecting device. Accordingly, the zero-point level of the detection output for light scattered by smoke can be lowered, and hence the reliability of the smoke detector can be enhanced.

Furthermore, a labyrinth structure in which a parallel passage portion and a labyrinth passage portion are continued from the inner side to the outer side is disposed between adjacent labyrinth members. Accordingly, light which enters from the inner smoke detecting chamber into the parallel passage portion between the labyrinth members travels toward the outside while being repeatedly reflected by the facing parallel flat faces. The labyrinth passage portion which is formed at the outlet portion has a plurality of bends, so that the reflected light is prevented from returning to the inner smoke detecting chamber. As a result, the zero-point level of the detection output for light scattered by smoke can be lowered and hence the reliability of the smoke detector enhanced.

While preferred embodiments of this invention have been described above, it will be obvious to those skilled in the art that various changes and modifications may be made thereto without departing from the invention, and it is aimed, therefore, to cover in the appended claims all such changes and modifications that fall within the spirit and scope of the invention.

What is claimed is:

1. A light scattering type smoke detector comprising:

a plurality of labyrinth members for facilitating an inflow of smoke entering from outside said smoke detector and cutting off light entering from outside said smoke detector, a plurality of smoke inlets being formed by respective spaces between adjacent pairs of said labyrinth members, and a smoke detecting chamber being formed by said labyrinth members in a center portion of said detector;

light emitting means for emitting light toward said smoke detecting chamber;

light detecting means, an optical axis of which crosses an optical axis of said light emitting means in said smoke detecting chamber, for detecting light emitted by said light emitting means which is scattered by said inflow of smoke in said smoke detecting chamber; and light shielding means for shielding said light detecting means from directly detecting said light emitted by said light emitting means, wherein a length of a labyrinth member crossing the optical axis of said light emitting means is longer than a length of an adjacent labyrinth member among said plurality of labyrinth members, said longer labyrinth member being disposed across said optical axis of said light detecting means from said light shielding means to form a gap around the optical axis of said light detecting means, the length of said longer labyrinth member being long enough to make the width of said gap small and to reduce the visual field of said light detecting means.

2. A light scattering type smoke detector according to claim 1, wherein a top end face of at least said longer labyrinth member among said plurality of labyrinth members is formed so as not to be directed light toward a light emitting surface of said light emitting means.

3. A light scattering type smoke detector according to claim 1, wherein said longer labyrinth member is disposed so as to prevent said light emitted by said light emitting means from reflecting directly toward said light detecting means and reflects said light toward the outside of said detector.

4. A light scattering type smoke detector according to claim 1, wherein said longer labyrinth member and said light shielding means do not cross said optical axis of said light detecting means.

5. A light scattering type smoke detector according to claim 1, wherein at least one of said plurality of labyrinth members has a rear end bent portion which is bent toward an inside portion of said detector.

6. A light scattering type smoke detector according to claim 1, wherein at least one of said plurality of labyrinth members has a top end bent portion which is parallel to one of said plurality of labyrinth members opposite and adjacent to said top end bent portion.

7. A light scattering type smoke detector according to claim 6, wherein at least one of said plurality of labyrinth members has a rear end bent portion which is bent toward the inside of said detector.

8. A light scattering type smoke detector comprising:

a plurality of labyrinth members for facilitating an inflow of smoke entering from outside said smoke detector and cutting off light entering from outside said smoke detector, a plurality of smoke inlets being formed by respective spaces between adjacent pairs of said labyrinth members, and a smoke detecting chamber being formed by said labyrinth members in a center portion of said detector;

light emitting means for emitting light toward said smoke detecting chamber;

light detecting means, an optical axis of which crosses an optical axis of said light emitting means in said smoke detecting chamber, for detecting light emitted by said light emitting means which is scattered by said inflow of smoke in said smoke detecting chamber; and light shielding means for shielding said light detecting means from directly detecting said light emitted by said light emitting means, wherein a length of a labyrinth member crossing the optical axis of said light emitting means is longer than a length of an adjacent labyrinth member among said plurality of labyrinth members, said longer labyrinth member being disposed across said optical axis of said light detecting means from said light shielding means, and wherein an extension line of said longer labyrinth member lies inside said light detecting means.

9. A light scattering type smoke detector comprising:

a plurality of labyrinth members for facilitating an inflow of smoke entering from outside said smoke detector and cutting off light entering from outside said smoke detector, a plurality of smoke inlets being formed by respective spaces between adjacent pairs of said labyrinth members, and a smoke detecting chamber being formed by said labyrinth members in a center portion of said detector;

light emitting means for emitting light toward said smoke detecting chamber;

light detecting means, an optical axis of which crosses an optical axis of said light emitting means in said smoke detecting chamber, for detecting light emitted by said light emitting means which is scattered by said inflow of smoke in said smoke detecting chamber; and light shielding means for shielding said light detecting means from directly detecting said light emitted by said light emitting means, wherein at least one of said plurality of labyrinth members has a top end bent portion which is parallel to one of said plurality of labyrinth members opposite and adjacent to said top end bent portion.

10. A light scattering type smoke detector according to claim 9, wherein at least one of said plurality of labyrinth members has a rear end bent portion which is bent toward the inside of said detector.

* * * * *